D. G. CLIFFORD.
TIRE INFLATION VALVE.
APPLICATION FILED JUNE 14, 1920.
1,403,484.
Patented Jan. 17, 1922.
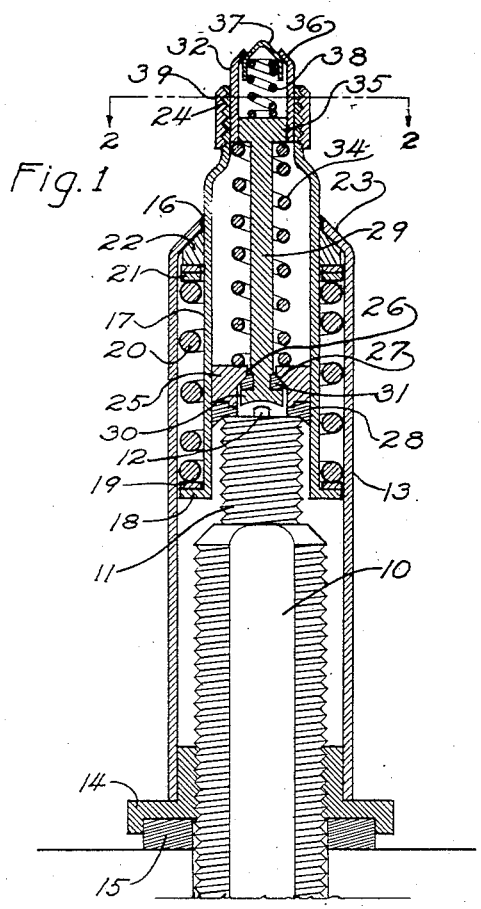
INVENTOR.
DELL G. CLIFFORD.
BY
ATTORNEYS.

UNITED STATES PATENT OFFICE.

DELL G. CLIFFORD, OF CHICAGO, ILLINOIS.

TIRE-INFLATION VALVE.

1,403,484. Specification of Letters Patent. Patented Jan. 17, 1922.

Application filed June 14, 1920. Serial No. 388,789.

*To all whom it may concern:*

Be it known that I, DELL G. CLIFFORD, a citizen of the United States, residing at Chicago, in the county of Cook and State of Illinois, have invented certain new and useful Improvements in Tire-Inflation Valves, of which the following is a specification.

This invention relates in general to improvements in tire inflation valves but more specifically the invention has reference to the protecting cap or dust guard therefor, and has for one of its objects to provide an improved cap of this character adapted to be applied to the valve stem and through which cap the tire may be readily inflated without necessitating the removal of the cap.

A further object is to provide an improved device of this character which will be simple, durable, light and cheap in construction and effective and efficient in operation, and which may, if desired be readily removed as a unit from the valve stem.

To the attainment of these ends and the accomplishment of other new and useful objects as will appear, the invention consists in the features of novelty in substantially the construction, combination and arrangement of the several parts hereinafter more fully described and claimed and shown in the accompanying drawing illustrating this invention and in which—

Figure 1 is a vertical longitudinal sectional view of one form of this invention, showing the same applied to a tire inflation valve stem, the valve stem being shown in elevation.

Figure 2 is a detail sectional view taken on line 2—2 Figure 1.

Figure 3 is a view similar to Figure 1 of a modified form of the invention.

Figure 4 is a detail sectional view taken on line 4—4 Figure 3.

Referring more particularly to the drawing the numeral 10 designates the ordinary tire inflation valve having the reduced thread extremity 11 usual in devices of this character. This valve stem 10 is provided with the usual valve 12 in one end thereof which is adapted to be unseated when the inflation tube is secured to the valve stem.

Co-operating with the valve stem is a dust cap or guard designated generally by the reference numeral 13 which is of a diameter somewhat larger than the external diameter of the valve stem 10 and is considerably longer than the projecting portion of the valve stem. This cap 13 may be provided at its lower end with a collar 14 connected thereto in any suitable manner and this collar is adapted to be threaded upon the valve stem to anchor the cap thereto. If desired or necessary suitable packing 15 may be provided beneath the collar 14.

The crown of the cap 13 is provided with an opening 16 therethrough and which opening is of any suitable diameter.

Projecting through this opening 16 is a tubular element 17 which is of any suitable diameter, preferably slightly larger than the reduced portion 11 of the valve stem and considerably smaller than the internal diameter of the cap 13. This element 17 is of any desired length and is preferably provided at its base, which latter is arranged within the cap 13, with a circumferential flange 18 upon which a suitable washer 19 may be disposed. Encompassing the tubular member 17 and within the cap 13 is a coil spring 20 one end of which rests against the washer 19 carried by the flange 18. The other end of the spring rests against suitable washers 21 which in turn abut a compressible packing 22, which packing may be of leather, fiber, or any suitable material. The crown of the cap 13 is preferably inclined as at 23 so that by the action of the spring 20 against the packing 22, the latter will be forced tightly against the inclined portion of the cap to form a fluid tight joint at the opening 16.

The tubular member 17 projects for any desired distance beyond the crown of the cap and the upper extremity of this element 17 is preferably reduced as at 24 so as to receive a pipe coupling or nipple which is connected with the usual hose for inflating the tire. Both ends of the tubular element 17 are open and arranged within the element and in proximity to the lower end of the element is a shoulder 25 which may be formed in any suitable manner either integral with the element 17 or separate therefrom and attached thereto in any suitable manner such as by threads, brazing, etc. This shoulder 25 in the form shown in Figure 1 embodies a collar having an opening 26 therethrough and surrounding the opening is a valve seat 27. Disposed between the collar 25 and the adjacent end of the valve stem 10 is a suitable compressible packing 28. When the cap is placed in position upon the valve stem and the collar 14 secured thereto, the packing 28 will abut the adjacent end of the valve stem 10 and the spring 20 co-operating with the flange 18 and the packing 22, which forms an abutment for the spring, will force the packing 28 against the end of the valve stem, to compress the packing and force a portion thereof between the tubular element 17 and the adjacent end of the valve stem 10 to form a fluid tight joint. Passing through the opening 26 in the collar 25 is a stem 29 which is provided with a shouldered or enlarged portion 30 on the end thereof below the collar 25 and suitable packing 31 is carried by this stem and co-operates with the valve seat 27 to form a fluid tight joint between the stem 29 and the collar 25 when the packing 31 is seated against the valve seat 27. This stem 29 projects upwardly in the tubular element 17 and terminates adjacent the upper extremity thereof in a tubular portion or casing 32 which is open at its upper end and is provided with openings 33 at its lower end. This tubular casing 32 is of a size to fit snugly but for sliding movement within the reduced open end of the tubular element 17, and an elastic member or coil spring 34 encompasses the stem 29, one end of the spring resting against the collar 25 and the other end resting against the bottom of the tubular portion 32 carried by the stem, and which portion 32 is preferably larger than the stem to form a shoulder 35.

This spring 34 tends normally to move the stem 29 in a direction to seat the valve 31 against the valve seat 27 and to normally hold the end 30 of the valve stem spaced from the extremity of the valve 12 which latter is carried by the valve stem 10.

The upper end of the tubular element 32 is open and the top of this element is deflected or contracted as at 36 to form a valve seat for a valve 37, the extremity of which latter is adapted to project through the opening in the end 36 of the element 32 and this valve 37 is yieldably held against its seat by means of a spring 38 arranged within the tubular element 32, one end of the spring resting against the valve 37 and the other end against the end of the stem 29.

With this improved construction it will be manifest that the spring 38 normally holds the valve 37 seated and the spring 34 normally holds the valve 31 seated against its seat 27 and spaced from the valve 12, while the spring 20 operates to hold the shoulder 25 and the packing 28 seated against the end of the valve stem 10.

In use, and when it is desired to inflate the tire, it is not necessary to remove the dust cap or guard 13 but the coupling or nipple at the end of the supply pipe may be attached to the end of the tubular element 17 in any suitable manner by placing the same upon the reduced portion 24 of the element 17 and securing the coupling or nipple in position in the ordinary and usual manner either by threads or otherwise. When in position and as the fluid is forced through the pipe it will flow into the tubular element 32 by reason of the valve 37 being unseated and from this element 32 will flow through the passages 33 into the chamber formed within the tubular element 17 above the shoulder 25. When the valve 37 is unseated it will compress the spring 38 and at the same time when the pipe coupling or nipple is secured in position the valve stem 29 will be shifted longitudinally against the stress of the spring 34 to unseat the valve 31 from the valve seat 27 to permit the fluid to flow from the chamber in the element 17 through the opening 26. As the stem 29 is shifted its end 30 will engage and unseat the valve 12 to permit the fluid to flow into the tire in the usual manner. As soon as the pressure of the fluid is relieved and the pipe or coupling detached, the springs 34—38 will tend to seat the valve 37 and shift the stem 29 so that the valve 12 will be permitted to close.

If desired and as means for protecting the threads 24 on the end of the tubular element 17, if threads are employed, a suitable protecting collar 39 may be employed and which is readily attachable and detachable.

In the form of the invention shown in Figure 3 the cap 40 is of a construction somewhat similar to the cap 13 but the upright walls thereof are preferably provided with ribs or corrugations 41 extending lengthwise thereof and connected to the lower end of the cap 40 is a collar 41$^a$ somewhat similar to the collar 14 but this collar 41$^a$ is rotatably connected with the cap by means of a rib or flange 42 adapted to be seated in a circumferential recess 43 in the end of the cap. Finger engaging portions or wings 44 may be provided on the collar 41 for rotating the latter. In this form of the invention the tubular element 45 is of a diameter only slightly larger than the reduced portion 11 of the valve stem 10 and the lower extremity of the portion 45 is deflected laterally toward the wall of the cap 40 and the deflected portion 46 is provided with recesses 47 adapted to receive the ribs or corrugations 41 and thereby hold the element 45 against rotation with respect to the cap 40 but which will permit of a free longitudinal movement of the elements 40 and 45 with respect to each other.

The element 45 is provided with threads 48 at its lower extremity adapted to engage the threads on the reduced portion 11 on the valve stem 10 and these threads 48 will operate to draw the packing 49 below the collar 50 against the adjacent extremity of the valve stem 10. The stem 51 corresponding with the stem 29 is provided with an enlarged extremity 52 adapted to engage the valve 12 to unseat the latter and the upper end of the stem 51 is enlarged as at 53, the extremity 54 thereof being reduced and projecting beyond the upper end of the tubular element 45. The portion 53 is shaped to form a valve as at 55 adapted to co-operate with the valve seat 56 and the portion 57 of the enlargement 53 is also shaped to form a valve or seat adapted to co-operate with the packing 58 to form a fluid tight joint between the portion 53 and the wall of the element 45. The packing 58 encompasses the stem 51 adjacent the portion 53 and if desired a washer 59 may be provided abutting the packing 58 against which washer 59 one end of a coil spring 60 which encompasses the stem 51, is seated. The other end of the spring 60 is seated against the collar 50. The tubular element 45 is adapted for free sliding movement through the opening 61 in the crown 62 of the cap 40.

With this form of the invention it will be manifest that when the cap is placed in position, the reduced extremity 11 of the stem 10 will project into the lower end of the open end of the element 45. The cap together with the element 45 is then rotated so as to screw the element on to the end of the valve stem, the ribs 41 and recesses 47 serving to cause the two to rotate together yet permitting of a relative longitudinal movement. When the element 45 has been screwed upon the extremity 11 and stem 10 sufficient to cause the shoulder 50 to compress the packing 49 against the end of the valve stem, the collar or nut 41 may be rotated with respect to the cap 40 upon the threads on the stem 10 to draw the cap 40 farther upon the valve stem and to cause the packing 63 beneath the collar 41 to be compressed against the wheel felloe.

Obviously this form of cap may be readily removed by grasping the wings and rotating the collar 41. This will cause both of the elements 40 and 45 to rotate until they have become disengaged from their respective threads.

In use, the operation of this device is the same as in the form shown in Figure 1 and by depressing the projecting extremity 54 of the valve stem 51, the valve 55 will be unseated and the packing 58 will be depressed so as to permit the fluid to readily flow between the enlarged portion 53 and the wall of the element 45 into the tubular element 45 from where it will flow into the valve stem 10 when the valve 12 is unseated by the pressure against the stem 51. When this pressure is released, the spring 60 will tend to seat the valve 55 and the packing 58, and at the same time will release the valve 12 to permit the valve to be seated. With this improved construction it will be manifest that it is not necessary to remove the cap when it is desired to inflate the tire but when desired the cap may be readily removed.

While the preferred forms of the invention have herein been shown and described, it is to be understood that various changes may be made in the details of construction and in the combination and arrangement of the several parts within the scope of the claims without departing from the spirit of this invention.

What is claimed as new is:

1. In combination, an inflation valve stem provided with a valve in one end, a dust cap longer than the projecting portion of the said stem and having an opening in the crown thereof, means for anchoring the cap, an auxiliary casing extending through the said opening and itself having an open end to receive the end of the said stem, said auxiliary casing having an inlet opening, a valve seat in the auxiliary casing, a valve co-operating with the seat, means whereby the operation of the last recited valve will unseat the first said valve, the second recited valve having a tubular extremity provided with an open end and having communication with the interior of the auxiliary casing, and a spring controlled valve for the said open end of the tubular extremity.

2. In combination, an inflation valve stem provided with a valve in the end thereof, a dust cap longer than said stem and having an opening through the crown thereof, means for anchoring the cap, an auxiliary casing having an open end to receive the end of the said stem, said casing extending through the cap, there being an inlet opening in the outermost end of the auxiliary casing, a valve and valve seat in the auxiliary casing, a stem projecting from the last said valve, the end of the last recited stem being tubular and having communication with the interior of the casing, and a spring controlled valve for controlling the last said opening.

3. In combination, an inflation valve stem provided with a valve in the end thereof, a dust cap longer than said stem and having an opening through the crown thereof, means for anchoring the cap, an auxiliary casing having an open end to receive the end of the said stem, said casing extending through the cap, there being an inlet opening in the outermost end of the auxiliary casing, a valve and valve seat in the auxiliary casing, a stem projecting from the last said valve, the end of the stem being tubular and having communication with the interior of the casing, and a spring controlled valve for controlling the last said opening, the last said valve being movable with the second recited valve and independently with respect thereto.

4. In combination, an inflation valve stem having a valve in one end, a dust cap longer than the projecting portion of the said stem, means for anchoring said cap to the stem, said cap having an opening in the crown thereof, a tubular element extending through said opening, a shoulder within said element, a compressible packing between the end of the valve stem and the said shoulder, means for holding said shoulder against the end of the valve stem, the other end of the said element being open, a valve seat encompassing the last said opening, a valve co-operating with said seat for controlling said opening, and means responsive to the unseating of the last recited valve for unseating the first recited valve.

5. In combination, an inflation valve stem provided with a valve in one end, a dust cap longer than the projecting portion of the said stem, means for anchoring said cap to the stem, said cap having an inflation opening in the upper end thereof, a valve seat encompassing said opening, a spring controlled valve co-operating with the seat to close said opening, a portion of the valve projecting through and beyond said opening, a stem connected with the last recited valve arranged in alinement with the first recited valve and adapted to engage and open the first recited valve when the second recited valve is unseated, and means interposed between the said valves and their respective seats and constituting an additional valve and seat to form a fluid tight joint between certain of the parts.

6. In combination, an inflation valve stem having a valve in one end thereof, a dust cap longer than the projecting portion of the valve stem and having an inflation opening through one end, a valve seat encompassing said opening, a spring controlled valve co-operating with said seat, a stem connected with the last said valve and adapted to engage and actuate the first said valve when the second recited valve is unseated, and means interposed between the said valves and their respective seats and operating to form a fluid tight joint between adjacent and relatively movable parts.

7. In combination, an inflation valve stem having a valve in one end, a dust cap longer than the projection portion of the stem, means for anchoring said cap to the stem, said cap having an opening in the crown thereof, a tubular element extending through said opening, a shoulder within the tubular element, means for holding the shoulder against the end of the valve stem, the other end of the tubular element being open, a valve seat encompassing the last said opening, a valve co-operating with said seat for controlling said opening, a stem projecting from the second recited valve, within the tubular element and adapted to engage and actuate the first recited valve when the second recited valve is unseated, and a spring also within the said tubular element encompassing the second recited stem and tending normally to seat the second recited valve.

8. In combination, an inflation valve stem having a valve in one end, a dust cap longer than the projecting portion of the stem, means for anchoring said cap to the stem, said cap having an opening in the crown thereof, a tubular element extending through said opening, a shoulder within the tubular element, means for holding the shoulder against the end of the valve stem, the other end of the tubular element being open, a valve seat encompassing the last said opening, a valve co-operating with said seat for controlling said opening, and means projecting from the second recited valve, within the tubular element and adapted to engage and actuate the first recited valve when the second recited valve is unseated, the free end of the said tubular element being shaped to receive a nipple or pipe coupling.

9. In combination, an inflation valve stem provided with a valve in one end, a dust cap longer than the said stem, means for anchoring said cap to the stem, said cap having an opening through one end thereof, an auxiliary casing extending through the opening and itself being open at one end and adapted to receive the end of the said valve stem, said auxiliary casing having an inlet opening and a valve seat, a valve co-operating with the valve seat, means responsive to the actuation of the last recited valve for actuating the valve in the valve stem, the free extremity of said auxiliary casing being exteriorly threaded, and a protecting annular element engaging the said threads.

In testimony whereof I have signed my name to this specification on this 9th day of June, A. D. 1920.

DELL G. CLIFFORD.